(12) United States Patent
Fujio et al.

(10) Patent No.: US 9,276,660 B2
(45) Date of Patent: Mar. 1, 2016

(54) CONTROL APPARATUS, CONTROL METHOD, AND WIRELESS COMMUNICATION SYSTEM

(71) Applicant: FUJITSU LIMITED, Kawasaki-shi, Kanagawa (JP)

(72) Inventors: Shunsuke Fujio, Kawasaki (JP); Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/541,935

(22) Filed: Nov. 14, 2014

(65) Prior Publication Data

US 2015/0140926 A1  May 21, 2015

(30) Foreign Application Priority Data

Nov. 18, 2013 (JP) ................................ 2013-238332

(51) Int. Cl.
*H04B 7/15* (2006.01)
*H04B 7/155* (2006.01)

(52) U.S. Cl.
CPC ........ *H04B 7/15528* (2013.01); *H04B 7/15507* (2013.01)

(58) Field of Classification Search
USPC .............. 455/3.02, 427–431, 7–9, 11.1, 12.1, 455/13.1, 13.2, 14–17; 370/226, 246, 274, 370/279, 293, 315, 316, 492, 501
See application file for complete search history.

(56) References Cited

U.S. PATENT DOCUMENTS

| 8,965,275 B2 * | 2/2015 | Liu ...................... H04B 7/1555 455/11.1 |
| 2008/0186907 A1 | 8/2008 | Yagyuu et al. |
| 2010/0195636 A1 * | 8/2010 | Nakashima ........... H04W 72/12 370/342 |
| 2012/0015662 A1 | 1/2012 | Zhang et al. |
| 2013/0033992 A1 * | 2/2013 | Higuchi ............... H04W 72/085 370/246 |
| 2013/0210341 A1 * | 8/2013 | Kiyoshima ........... H04W 52/46 455/15 |

FOREIGN PATENT DOCUMENTS

| JP | 8-7418 A | 1/1996 |
| JP | 2005-168020 A | 6/2005 |
| JP | 2010-57072 A | 3/2010 |
| WO | WO 2010/087209 A1 | 8/2010 |

OTHER PUBLICATIONS

Xu, Jie, et al., "Area Power Consumption in a Single Cell Assisted by Relays," IEEE/ACM International Conference on Green Computing and Communications & IEEE/ACM International Conference on Cyber, Physical and Social Computing, pp. 460-465, Dec. 2010.

* cited by examiner

*Primary Examiner* — Dominic E Rego
(74) *Attorney, Agent, or Firm* — Arent Fox LLP

(57) ABSTRACT

A control apparatus in a wireless communication system including a base station, a plurality of relay stations, and a plurality of terminals, each of the plurality of relay stations being configured to relay wireless signals between the base station and the plurality of terminals, the control apparatus including: a memory, and a processor coupled to the memory and configured to determine relay schedules based on first information associated with first path losses between any pair of the plurality of relay stations, each of the relay schedules defining each of relay periods for each of the plurality of relay stations relaying the wireless signals, and transmit each of the relay schedules to each of the plurality of relay stations respectively.

17 Claims, 14 Drawing Sheets

CONTROL APPARATUS, CONTROL METHOD, AND WIRELESS COMMUNICATION SYSTEM

CROSS-REFERENCE TO RELATED APPLICATION

This application is based upon and claims the benefit of priority of the prior Japanese Patent Application No. 2013-238332, filed on Nov. 18, 2013, the entire contents of which are incorporated herein by reference.

FIELD

The embodiments discussed herein are related to a control apparatus, a control method, and a wireless communication system.

BACKGROUND

In cellular communication in which radio base station devices and radio terminal devices communicate with each other, radio relay station devices that perform amplification and relay are used in some cases. Hereinafter, a radio base station device, a radio terminal device, and a radio relay station device may be referred to as a "base station", a "terminal", and a "relay station", respectively. A relay station amplifies a signal transmitted from one of a base station and a terminal, and relays the signal to the other. This makes it possible to increase communication quality by improving reception quality. For this reason, by densely arranging a plurality of relay stations within the "communication area" of a base station, the communication quality of the entire communication area is expected to be improved. Note that the "communication area" is an area at which radio waves transmitted from a base station arrive with a power equal to or larger than a predetermined value.

However, when a plurality of relay stations existing within the communication area of a base station perform transmission (relaying) using the same frequency, that is, when relay stations are of a full-duplex type, there are some cases where a signal transmitted (relayed) by a first relay station is received by a second relay station. Then, the received signal may be transmitted (relayed) by the second relay station, and thereafter be received by the first relay station. That is, a signal on which relay processing is repeatedly performed by a plurality of relay stations will be received with a large delay by a receiving device, which is a base station or a terminal. Such a signal with a large delay is likely to cause large interference in the receiving device. Additionally, since relay processing is repeatedly performed, there is a possibility that the power value of a signal input to an amplifier of a relay station exceeds a value assumed at the design phase, which, in turn, causes an amplifier to oscillate.

To avoid such a problem, a technique has been proposed for stopping relay processing of some of a plurality of relay stations included within a communication area, based on each propagation attenuation (that is, path loss) between a relay station and a terminal.

"Area Power Consumption in a Single Cell Assisted by Relays" in Proc. IEEE/ACM Int. Conf. Green Computing and Communications (GreenCom) & Int. Conf. Physical and Social Computing (CPSCom), December 2010, pp. 460-465 discloses an example of the related art.

SUMMARY

According to an aspect of the invention, a control apparatus in a wireless communication system including a base station, a plurality of relay stations, and a plurality of terminals, each of the plurality of relay stations being configured to relay wireless signals between the base station and the plurality of terminals, the control apparatus includes a memory, and a processor coupled to the memory and configured to determine relay schedules based on first information associated with first path losses between any pair of the plurality of relay stations, each of the relay schedules defining each of relay periods for each of the plurality of relay stations relaying the wireless signals, and transmit each of the relay schedules to each of the plurality of relay stations respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
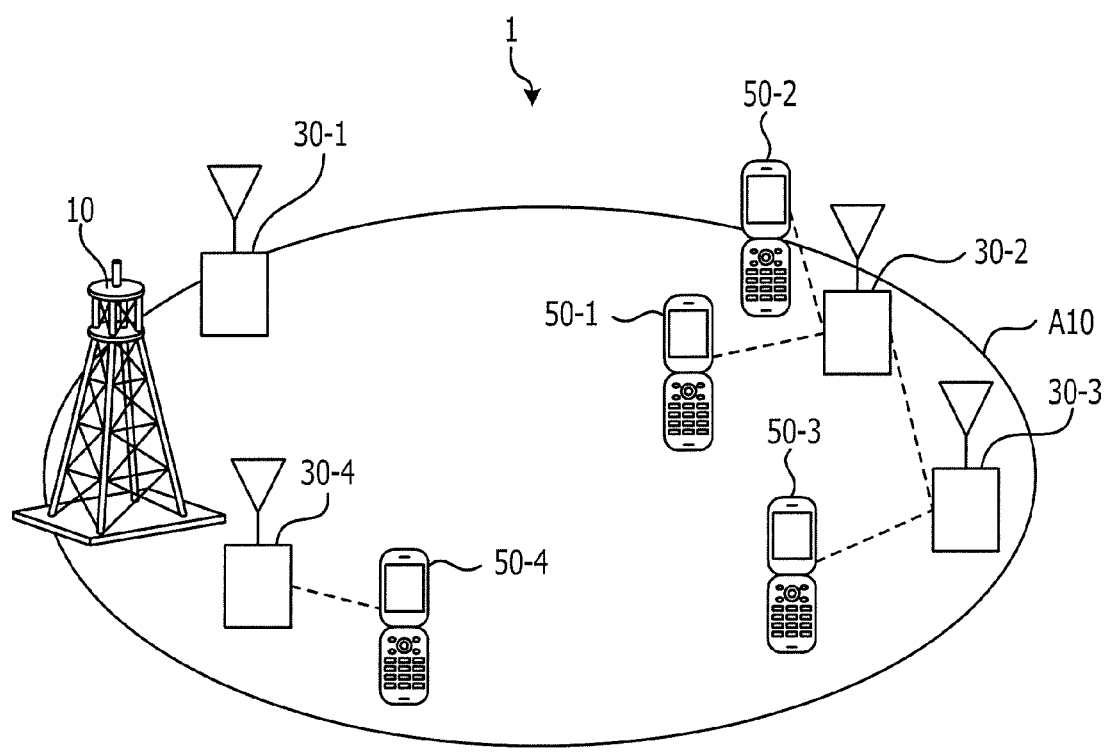
FIG. 1 is a pictorial representation illustrating an example of a communication system of a first embodiment.

However, even though relay processing of some of the relay stations is stopped based on path losses between relay stations and terminals as in the aforementioned related technique, such a problem as mentioned above would arise if a plurality of relay stations performing relay processing are densely arranged.

In view of the above, it is an object of the technique disclosed herein to provide a control apparatus, a relay control method, and a communication system capable of reducing interference.

Hereinafter, embodiments of a control apparatus, a relay control method, and a communication system disclosed herein will be described in detail with reference to the accompanying drawings. It is to be noted that the control apparatus, the relay control method, and the communication system disclosed herein are not limited to the embodiments. It is also to be noted that, in the embodiments, configurations having the same functions are denoted by the same reference numerals and redundant description thereof is omitted. In the embodiments, the same steps are denoted by the same reference numerals and redundant description thereof is omitted.

First Embodiment

Overview of Communication System

FIG. 1 is a pictorial representation illustrating an example of a communication system of a first embodiment. In FIG. 1, a communication system 1 includes a base station 10, relay stations 30-1 to 30-4, and terminals 50-1 to 50-4. Although one base station 10, four relay stations 30, and four terminals 50 are illustrated here, the numbers of the components are not limited to these numbers. Additionally, hereinafter, the relay stations 30-1 to 30-4 are sometimes generically referred to as relay stations 30 if they are not to be discriminated from one another. Similarly, the terminals 50-1 to 50-4 are sometimes generically referred to as terminals 50 if they are not to be discriminated from one another.

The base station 10 acquires information on path loss values between the relay stations 30 (hereinafter sometimes referred to as "first path loss values") within a communication area A10. Then, the base station 10 assigns a "relay pattern" (hereinafter may be referred to as "relay schedules") to each relay station 30 based on the first path loss value between the relay stations 30. A "relay pattern" defines execution or non-execution of relay in each of a plurality of "unit periods" (namely, "relay pattern" or "relay schedules" define relay period when each of the plurality of relay stations relaying the wireless signals among sequential periods having a given length). That is, control for execution and non-execution of relay in the relay station 30 is performed for each "unit period". Then, the base station 10 notifies each relay station 30 of the assigned relay pattern. Note that the number of unit periods included in a relay pattern is sometimes referred to as a "pattern length" hereinafter.

For example, the base station 10 assigns a plurality of relay patterns in which unit periods indicating execution of relay for a first group of relay stations 30, among a plurality of relay stations 30, do not overlap one another, to the first group of relay stations 30. The first group of relay stations 30 are relay stations each having a first path loss value smaller than a "first threshold". In contrast, the base station 10 assigns a relay pattern in which all the unit periods indicate execution of relay, to the relay stations 30 each having a first path loss value equal to or larger than the first threshold. Note that a dotted line in FIG. 1 indicates a propagation path between one relay station 30 and the other relay station 30 between which the first path loss value is smaller than the first threshold, or a propagation path between the relay station 30 and the terminal 50 between which a second path loss value, described below, is smaller than a second threshold.

The base station 10 also acquires "signal quality information" from each terminal 50 in a predetermined cycle. "Signal quality information" is information indicating the reception quality in each terminal 50 of a signal transmitted from the base station 10. This reception quality is the reception quality of a composite signal composed of a signal transmitted from the base station 10 and received directly, not through the relay station 30, but by the terminal 50 and a signal relayed by the relay station 30.

The base station 10 also acquires path loss values between the terminal 50 and the relay station 30 (hereinafter, sometimes referred to as "second path loss values") from the terminals 50. Then, the base station 10 identifies a combination of the terminal 50 and the relay station 30 where the second path loss value is smaller than the "second threshold".

Next, the base station 10 performs scheduling for a plurality of terminals 50 to be subjected to scheduling, based on signal quality information acquired from that plurality of terminals 50. Note that the base station 10 may perform scheduling for the terminal 50 to be subjected to scheduling, based on signal quality information acquired from the terminal 50 concerned and a relay pattern assigned to the relay station 30 where the second path loss value between the relay station 30 concerned and the terminal 50 concerned is smaller than the second threshold.

The relay station 30 acquires information on a relay pattern assigned thereto. Then, the relay station 30 performs relay processing based on the relay pattern indicated by the acquired information.

As described above, the base station 10 assigns relay patterns to the relay stations 30 based on the first path loss values between the relay stations 30, thereby enabling relay control to be performed in consideration of the density among a plurality of relay stations 30. This may reduce interference highly accurately.

Exemplary Configuration of Base Station

Figure 2:
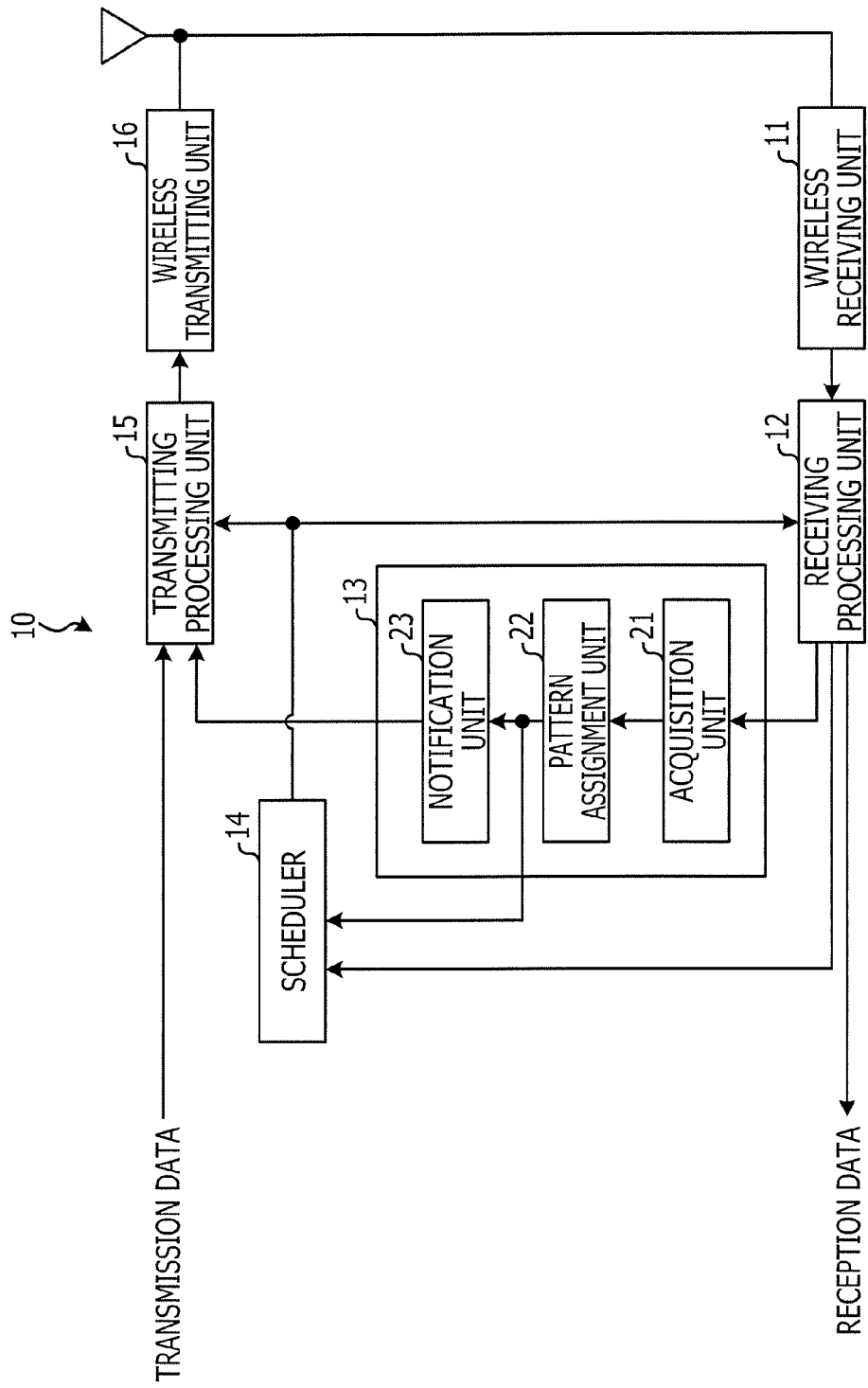
FIG. 2 is a block diagram illustrating an example of a base station of the first embodiment.

FIG. 2 is a block diagram illustrating an example of a base station of the first embodiment. In FIG. 2, the base station 10 includes a wireless receiving unit 11, a receiving processing unit 12, a pattern-assignment control unit 13, a scheduler 14, a transmitting processing unit 15, and a wireless transmitting unit 16. The pattern-assignment control unit 13 includes an acquisition unit 21, a pattern assignment unit 22, and a notification unit 23.

The wireless receiving unit 11 performs predetermined wireless reception processing, that is, down-conversion, analog-to-digital conversion, and so forth on a reception signal received through an antenna, and outputs the reception signal after the wireless reception processing to the receiving processing unit 12.

The receiving processing unit 12 performs predetermined reception processing on the reception signal received from the wireless receiving unit 11, and extracts information on the aforementioned first path loss value, information on the aforementioned second path loss value, the aforementioned signal quality information, and reception data from the reception signal after the reception processing. The receiving processing unit 12 then outputs the extracted information on the first path loss value and information on the second path loss value to the pattern-assignment control unit 13. The receiving processing unit 12 also outputs the extracted signal quality information to the scheduler 14. The receiving processing unit 12 also outputs the extracted reception data to a function unit (not illustrated) at a subsequent stage. Here, the receiving processing unit 12 extracts reception data from resources indicated by resource assignment information (uplink resource assignment information) received from the scheduler 14.

The acquisition unit 21 acquires the information on the first path loss value and the information on the second path loss value from the receiving processing unit 12, and outputs them to the pattern assignment unit 22.

The pattern assignment unit 22 assigns relay patterns to the relay stations 30 based on the first path loss values between the relay stations 30. For example, the pattern assignment unit 22 assigns a plurality of relay patterns among which unit periods indicating execution of relay for the first group of relay stations 30 do not overlap one another, to the first group of relay stations 30. The first group of relay stations 30 are, among a plurality of relay stations 30, relay stations each having a first path loss value smaller than the first threshold. Additionally, the pattern assignment unit 22 may assign a relay pattern including more unit periods indicating execution of relay to a relay station 30 for which there exist, among a plurality of relay stations 30 as the first group, more terminals 50 each having a second path loss value smaller than the second threshold. That is, if the following first condition is satisfied, the pattern assignment unit 22 may assign a second relay pattern to the second relay station 30. The second relay pattern includes more unit periods indicating execution of relay than a first relay pattern assigned to the first relay station 30 among the plurality of relay patterns as the first group. The first condition is that the number of the terminals 50 each of which has a second path loss value between that terminal 50 and the second relay station 30 smaller than the second threshold is to be larger than the number of the terminals 50 each of which has a second path loss value between that terminal 50 and the first relay station 30, among the plurality of relay stations 30 as the first group, smaller than the second threshold. Additionally, the pattern assignment unit 22 may perform assignment in such a manner that the ratio of the number of unit periods indicating execution of relay included in the aforementioned first assignment pattern to the number of unit periods indicating execution of relay included in the aforementioned second assignment pattern is equal to the ratio of the number of the terminals 50 each of which has a second path loss value between that terminal 50 and the first relay station 30 smaller than the second threshold to the number of the terminals 50 each of which has a second path loss value between that terminal 50 and the second relay station 30 smaller than the second threshold.

In contrast, the pattern assignment unit 22 assigns a relay pattern in which all the unit periods indicate execution of relay, to the relay station 30 having a first path loss value equal to or larger than the first threshold. The pattern assignment unit 22 may also assign a relay pattern in which all the unit periods indicate non-execution of relay, to the relay station 30 for which there does not exist a terminal 50 having a second path loss value smaller than the second threshold.

Then, the pattern assignment unit 22 outputs information indicating a relay pattern assigned to each relay station 30 and identification information for each relay station 30 to the notification unit 23 and the scheduler 14. Note that relay patterns may be assigned separately between the uplink and the downlink, or may be assigned collectively to both the uplink and the downlink.

The notification unit 23 notifies each relay station 30 of the relay pattern assigned to that relay station 30. That is, the notification unit 23 generates a "notification signal" including information indicating a relay pattern assigned to the relay station 30 received from the pattern assignment unit 22 and identification information for the relay station 30, and transmits the signal through the transmitting processing unit 15 and the wireless transmitting unit 16 to the relay station 30.

The scheduler 14 receives signal quality information from the receiving processing unit 12. The signal quality information is transmitted (reported) in a predetermined cycle from each terminal 50. The scheduler 14 also receives information indicating a relay pattern assigned to each relay station 30 and identification information for each relay station 30 from the pattern assignment unit 22.

Then, the scheduler 14 performs scheduling, that is, assigns resources to a plurality of terminals 50 to be subjected to scheduling, based on signal quality information acquired from that plurality of terminals 50. Note that the base station 10 may perform scheduling for the terminal 50 to be subjected to scheduling, based on signal quality information acquired from the terminal 50 concerned and a relay pattern assigned to the relay station 30 where the second path loss value between the relay station 30 concerned and the terminal 50 concerned is smaller than the second threshold.

Then, the scheduler 14 transmits a scheduling result, that is, resource assignment information for each terminal 50 to be subjected to scheduling, through the transmitting processing unit 15 and the wireless transmitting unit 16, to each terminal 50. The scheduling result may be transmitted using a control channel.

The scheduler 14 also outputs resource assignment information to the transmitting processing unit 15 and the receiving processing unit 12. The transmitting processing unit 15 receives transmission data and resource assignment information (uplink resource assignment information) as inputs, subjects them to predetermined transmission processing, and outputs them to the wireless transmitting unit 16. The predetermined transmission processing includes encoding processing and modulation processing. Here, the transmitting processing unit 15 maps resource assignment information on a control channel and outputs the information to the wireless transmitting unit 16. The transmitting processing unit 15 maps transmission data addressed to each terminal 50 on resources (time, and frequency or the like) indicated by the resource assignment information (downlink resource assignment information) for each terminal 50, and outputs the data to the wireless transmitting unit 16.

The wireless transmitting unit 16 performs predetermined wireless transmission processing, that is, digital-to-analog conversion, up-conversion, and so forth on the transmission signal after the predetermined transmission processing, and transmits the transmission signal after the wireless transmission processing through an antenna.

Exemplary Configuration of Relay Station

Figure 3:
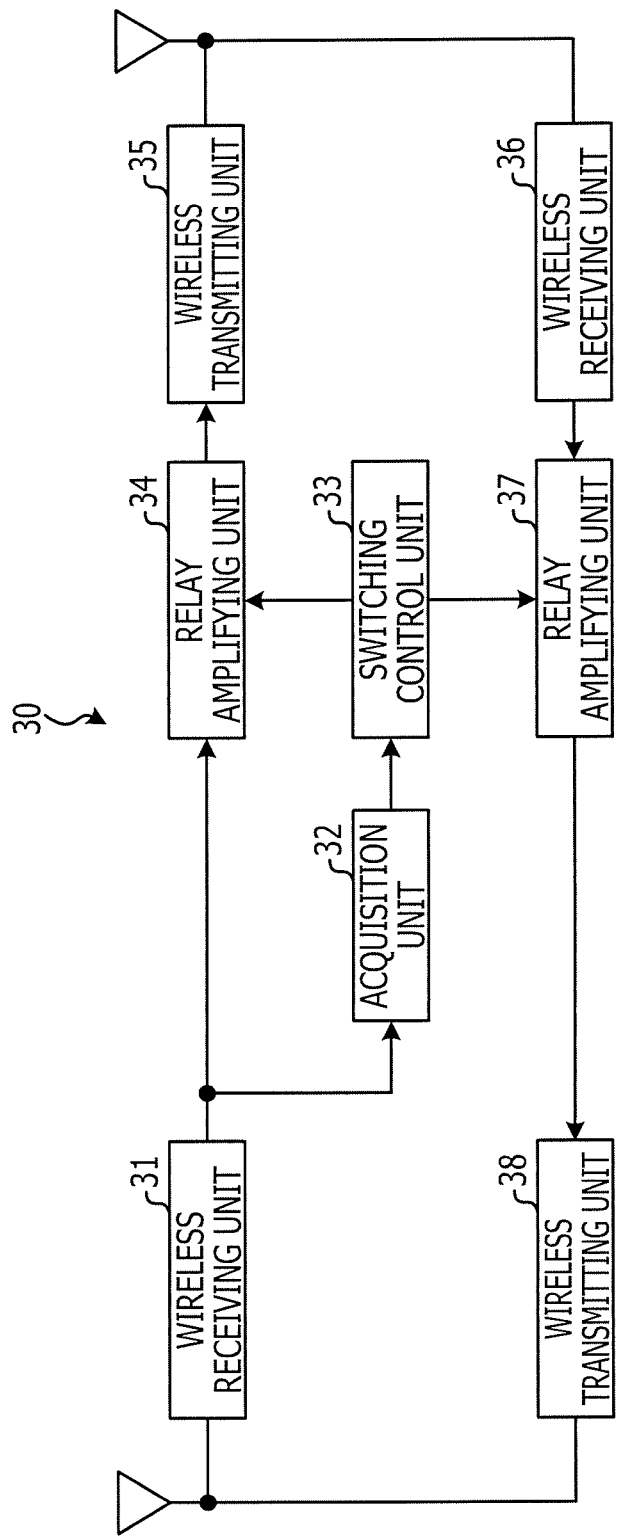
FIG. 3 is a block diagram illustrating an example of a relay station of the first embodiment.

FIG. 3 is a block diagram illustrating an example of a relay station of the first embodiment. In FIG. 3, the relay station 30 includes wireless receiving units 31 and 36, an acquisition unit 32, a switching control unit 33, relay amplifying units 34 and 37, and wireless transmitting units 35 and 38. The wireless receiving unit 31, the relay amplifying unit 34, and the wireless transmitting unit 35 support the downlink. The wireless receiving unit 36, the relay amplifying unit 37, and the wireless transmitting unit 38 support the uplink.

The wireless receiving unit 31 receives a signal transmitted from the base station 10, through an antenna, performs predetermined wireless reception processing, that is, down-conversion, analog-to-digital conversion, and so forth on the received signal, and outputs the received signal after the wireless reception processing to the acquisition unit 32 and the relay amplifying unit 34.

The acquisition unit 32 acquires information indicating a relay pattern addressed to its relay station 30 that has been transmitted from the base station 10. That is, the acquisition unit 32 extracts information indicating a relay pattern addressed to its relay station 30 from a reception signal received from the wireless receiving unit 31. Then, the acquisition unit 32 outputs the extracted information indicating a relay pattern addressed to its relay station 30, to the switching control unit 33.

Based on the relay pattern information received from the acquisition unit 32, the switching control unit 33 performs control for switching the relay amplifying unit 34 and the relay amplifying unit 37 on and off. For example, the relay pattern information includes an uplink relay pattern and a downlink relay pattern. Then, the switching control unit 33 outputs an ON instruction signal to the relay amplifying unit 34 at the time when a unit period indicating execution of relay in a downlink relay pattern begins, and outputs an OFF instruction signal to the relay amplifying unit 34 at the time when a unit period indicating non-execution of relay begins. Thus, the relay amplifying unit 34 will be turned on or off depending on the downlink relay pattern. The switching control unit 33 also outputs an ON instruction signal to the relay amplifying unit 37 at the time when a unit period indicating execution of relay in an uplink relay pattern begins, and outputs an OFF instruction signal to the relay amplifying unit 37 at the time when a unit period indicating non-execution of relay begins. Thus, the relay amplifying unit 37 will be turned on or off depending on the uplink relay pattern.

The relay amplifying unit 34 is in an ON state from a timing at which an ON instruction signal is received until an OFF instruction signal from the switching control unit 33 is received. In the ON state, the relay amplifying unit 34 amplifies a signal received from the wireless receiving unit 31, and outputs the amplified signal to the wireless transmitting unit 35. Note that, in the OFF state, the relay amplifying unit 34 stops signals being output to the wireless transmitting unit 35.

The wireless transmitting unit 35 performs predetermined wireless transmission processing, that is, digital-to-analog conversion, up-conversion, and so forth on a signal received from the relay amplifying unit 34, and transmits the signal after the wireless transmission processing through an antenna.

The wireless receiving unit 36 receives a signal transmitted from the terminal 50 existing in the communication area of its relay station, performs predetermined wireless transmission processing, that is, down-conversion, analog-to-digital conversion, and so forth on the received signal, and outputs the received signal after the wireless reception processing to the relay amplifying unit 37.

The relay amplifying unit 37 is in an ON state from a timing at which an ON instruction signal is received until an OFF instruction signal from the switching control unit 33 is received. In the ON state, the relay amplifying unit 37 amplifies a signal received from the wireless receiving unit 36, and outputs the amplified signal to the wireless transmitting unit 38. Note that, in the OFF state, the relay amplifying unit 37 stops signals being output to the wireless transmitting unit 38.

The wireless transmitting unit 38 performs predetermined wireless transmission processing, that is, digital-to-analog conversion, up-conversion, and so forth on the signal received from the relay amplifying unit 37, and outputs the signal after the wireless transmission processing through an antenna.

Operations of Communication System

Figure 4:
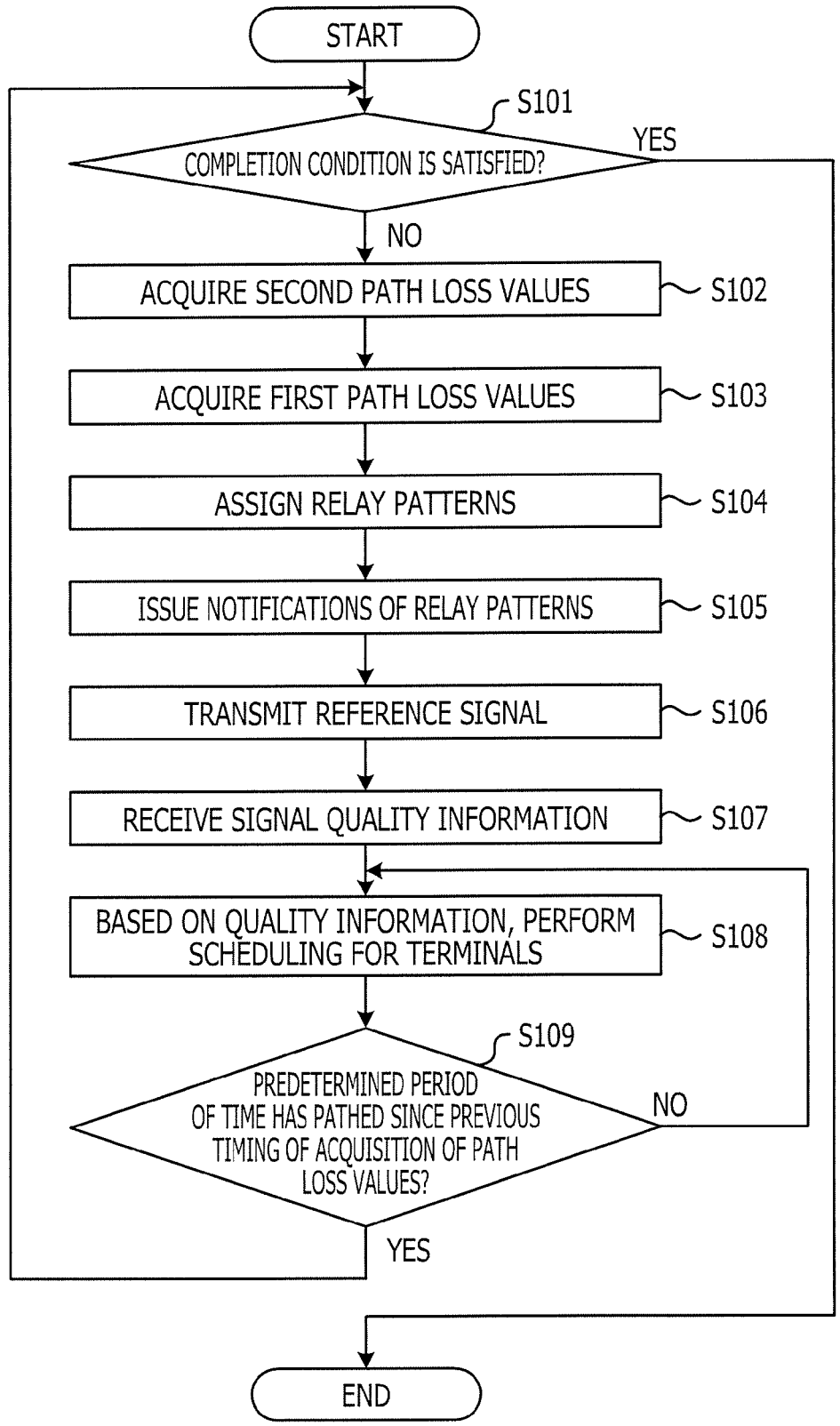
FIG. 4 is a flowchart illustrating an example of processing operations of the base station of the first embodiment.

Processing operations of the communication system 1 having the configuration described above will be described. In particular, the processing operations of the base station 10 will mainly be described. FIG. 4 is a flowchart illustrating an example of processing operations of a base station of the first embodiment. The flow of FIG. 4, for example, starts at a timing when the base station 10 is powered on, and ends when the completion condition is satisfied (affirmative at step S101).

If the completion condition is not satisfied (negative at step S101), the acquisition unit 21 in the base station 10 acquires (collects) second path loss values, each of which is a value between the relay station 30 and the terminal 50, from the terminal 50 within the communication area A10 (step S102). Measurement of second path loss values is performed in such a way that each terminal 50 measures a path loss value based on a reference signal transmitted at a predetermined transmission power from each relay station 30. Then, each terminal 50 reports the measured second path loss value to the base station 10.

The acquisition unit 21 also acquires, from each relay station 30 in the communication area A10, a first path loss value between each relay station 30 and another relay station 30 (step S103). Measurement of first path loss values is performed in such a way that each relay station 30 measures a path loss value based on a reference signal transmitted at a predetermined transmission power from each of the other relay stations 30. Then, each relay station 30 reports the measured first path loss value to the base station 10.

The pattern assignment unit 22 assigns relay patterns to the relay stations 30, respectively (step S104). That is, the pattern assignment unit 22 assigns relay patterns to the relay stations 30, based on the first path loss values and the second path loss values acquired by the acquisition unit 21.

Figure 5:
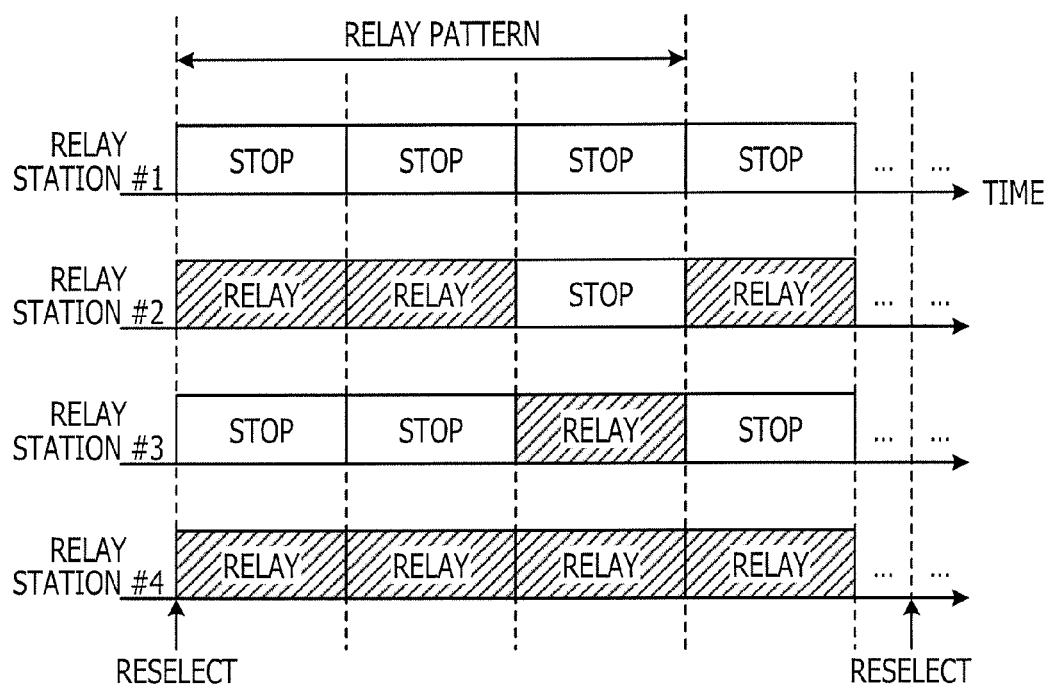
FIG. 5 is a diagram illustrating an example of assignment results of relay patterns of the first embodiment.

For example, in FIG. 1, a terminal 50 does not exist where the second path loss value between that terminal 50 and the relay station 30-1 is smaller than the second threshold. For this reason, if the relay station 30-1 performs relay processing, it merely incurs interference. Accordingly, as illustrated in FIG. 5, the pattern assignment unit 22 assigns a relay pattern in which all the unit periods indicate non-performance of relay, to the relay station 30-1. FIG. 5 is a diagram illustrating an example of assignment results of relay patterns of the first embodiment.

Additionally, in FIG. 1, a relay station 30 does not exist where the first path loss value between that relay station 30 and the relay station 30-4 is smaller than the first threshold. For this reason, if the relay station 30-4 performs relay processing, it does not incur interference. Accordingly, as illustrated in FIG. 5, the pattern assignment unit 22 assigns a relay pattern in which all the unit periods indicate execution of relay, to the relay station 30-4.

Additionally, in FIG. 1, the relay station 30 (that is, the relay station 30-3) exists where the first path loss value between the relay station 30-3 and the relay station 30-2 is smaller than the first threshold, and the relay station 30 (that is, the relay station 30-2) exists where the first path loss value between the relay station 30-2 and the relay station 30-3 is smaller than the first threshold. For this reason, if the relay station 30-2 and the relay station 30-3 perform relay processing at the same time, interference is likely to occur. Accordingly, as illustrated in FIG. 5, the pattern assignment unit 22 assigns two relay patterns having non-overlapping unit periods indicating execution of relay to the relay station 30-2 and the relay station 30-3. Additionally, two terminals 50 (that is, the terminal 50-1 and the terminal 50-2) exist where the second path loss value between the terminal 50-1 and the relay station 30-2 and the second path loss value between the terminal 50-2 and the relay station 30-2 are each smaller than the second threshold, and one terminal 50 (that is, the terminal 50-3) exists where the second path loss value between the terminal 50-3 and the relay station 30-3 is smaller than the second threshold. In such a situation, as illustrated in FIG. 5, the pattern assignment unit 22 assigns a relay pattern where the number of unit periods indicating execution of relay is doubled compared to the relay pattern assigned to the relay station 30-3, to the relay station 30-2. Note that, in FIG. 5, the pattern length of the relay pattern is set to three.

Referring back to FIG. 4, the notification unit 23 notifies the relay stations 30 of relay patterns respectively assigned thereto (step S105).

The base station 10 transmits a reference signal (step S106).

Figure 6:
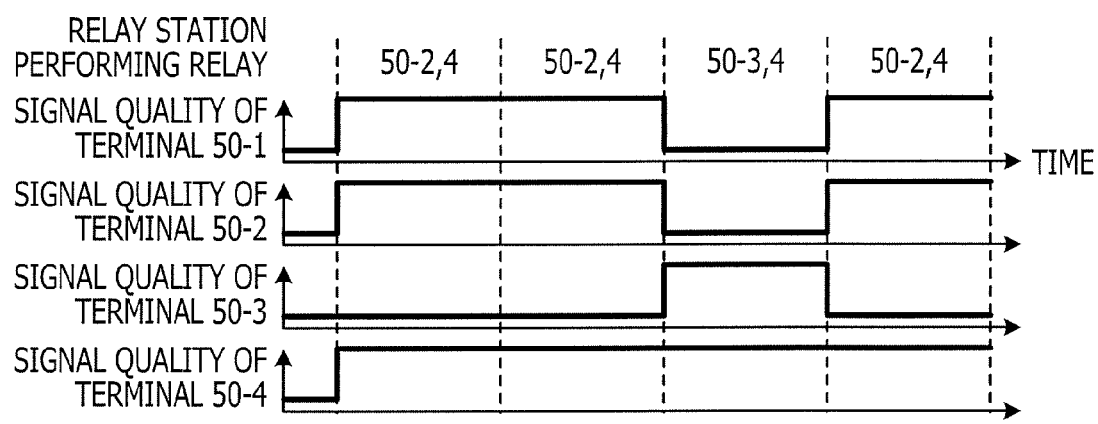
FIG. 6 is a timing chart for explaining signal quality indicated by signal quality information.

The scheduler 14 receives the signal quality information transmitted from each terminal 50 through the wireless receiving unit 11 and the receiving processing unit 12 (step S107). FIG. 6 is a timing chart for explaining signal quality indicated by signal quality information. As illustrated in FIG. 6, when viewed instantaneously, the terminal 50 exists where the signal quality is degraded because the nearby relay station 30 stops relaying. However, the base station 10 appropriately performs scheduling for the terminal 50 at a timing at which the signal quality of the terminal 50 increases. Thus, high-quality communication may be implemented.

The scheduler 14 performs scheduling for a plurality of terminals 50 to be subjected to scheduling, based on signal quality information acquired from that plurality of terminals 50 (step S108).

The scheduler 14 determines whether a predetermined period of time has passed since the previous timing at which the first path loss value and the second path loss value were acquired (step S109). If the predetermined period of time has not passed (negative at step S109), the process returns to step S108. If the predetermined period of time has passed (affirmative at step S109), the process returns to step S101.

As described above, according to this embodiment, the acquisition unit 21 in the base station 10 acquires information on first path loss values between the relay stations 30 existing within the communication area of the base station 10. Then, the pattern assignment unit 22 assigns relay patterns defining execution or non-execution of relay in each of a plurality of unit periods, to the relay stations 30, based on the first path loss values between the relay stations 30. Then, the notification unit 23 notifies the relay stations 30 of relay patterns respectively assigned thereto.

With such a configuration of the base station 10, relay control in consideration of a clearance between one relay station 30 and another relay station 30, or the like, that is, the density among a plurality of relay stations 30 may be performed. This may reduce interference highly accurately. Additionally, execution and non-execution of relay may be set in a period of time that is somewhat long, which may reduce the overhead of a control signal.

Additionally, the pattern assignment unit 22 assigns a plurality of relay patterns among which their unit periods indicating execution of relay do not overlap one another, to a plurality of relay stations 30 as the first group having first path loss values each smaller than the first threshold, respectively, among a plurality of relay stations 30.

With such a configuration of the base station 10, the relay execution timings of a plurality of relay stations 30 existing at distances where the plurality of relay stations 30 mutually relay their transmission signals may be staggered. This may reduce interference highly accurately.

Additionally, the acquisition unit 21 acquires information on a second path loss value between each terminal 50 and the relay station 30 from each terminal 50. If the number of the terminals 50 each of which has a second path loss value between that terminal 50 and the second relay station 30 smaller than the second threshold is larger than the number of the terminals 50 each of which has a second path loss value between that terminal 50 and the first relay station 30, among a plurality of relay stations 30 as the first group, smaller than the second threshold, the pattern assignment unit 22 assigns the second relay pattern, which includes more unit periods indicating execution of relay than the first relay pattern assigned to the first relay stations 30, to the second relay station 30.

For example, the pattern assignment unit 22 may perform assignment in such a manner that the ratio of the number of unit periods indicating execution of relay included in the aforementioned first assignment pattern to the number of unit periods indicating execution of relay included in the aforementioned second assignment pattern is equal to the ratio of the number of the terminals 50 each of which has a second path loss value between that terminal 50 and the first relay station 30 smaller than the second threshold to the number of the terminals 50 each of which has a second path loss value between that terminal 50 and the second relay station 30 smaller than the second threshold.

With such a configuration of the base station 10, relay processing time periods (resources) may be respectively assigned to the relay stations 30 in accordance with communication traffic.

Additionally, the pattern assignment unit 22 assigns a relay pattern in which all the unit periods indicate execution of relay, to the relay station 30 having a first path loss value equal to or larger than the first threshold.

With such a configuration of the base station 10, the relay station 30 that is unlikely to incur interference is allowed to perform relay processing at any time. Therefore, the effect of improved communication quality due to the relaying may be realized.

The pattern assignment unit 22 also assigns a relay pattern in which all the unit periods indicate non-execution of relay, to the relay station 30 for which a terminal 50 having a second path loss value smaller than the second threshold does not exist.

With such a configuration of the base station 10, the relay station 30 that does not perform substantial relaying is inhibited from performing relay processing. This may remove the cause of interference.

Additionally, the pattern assignment unit 22 may increase the pattern length in accordance with the density of the relay stations 30, that is, the number of relay stations 30 each having a small first path loss value.

Additionally, the pattern assignment unit 22 may select a relay pattern to be assigned to the relay station 30 from a table storing candidates for the relay pattern, or may decide upon a relay pattern to be assigned to the relay station 30 using an algorithm when an occasion arises.

Figure 7:
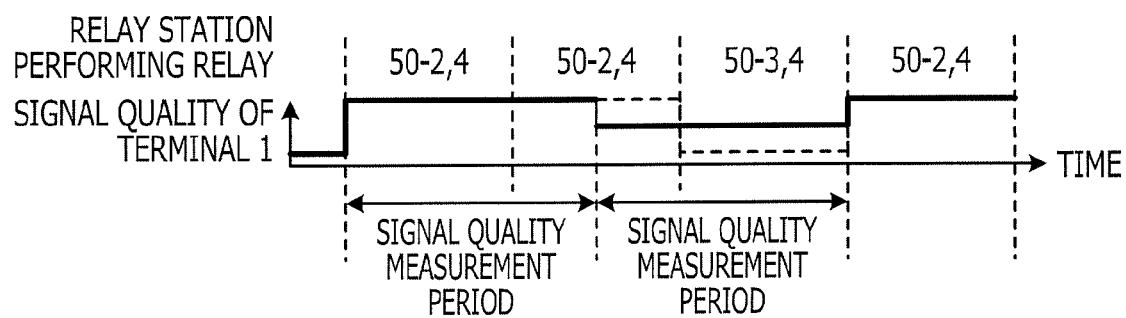
FIG. 7 is a timing chart for explaining a gap between the actual signal quality and the measured signal quality.

Note that measurement of signal quality is performed based on a reference signal in the "signal quality measurement period" having a certain duration. If the "signal quality measurement period" and the "unit period" do not agree with each other, different relay states are included within one signal quality measurement period. This results in a situation in which it might be impossible to correctly measure signal quality. FIG. 7 is a timing chart for explaining a gap between actual signal quality and the measured signal quality. To address this, the signal quality measurement period and the unit period may be made equal. That is, the unit period may be equal to the period for measuring signal quality in each terminal 50. Alternatively, the unit period may be an integer (two or more) multiple of the signal quality measurement period. Note that, in FIG. 7, a solid line indicates actual signal quality and a dotted line indicates measured signal quality.

Figure 8:
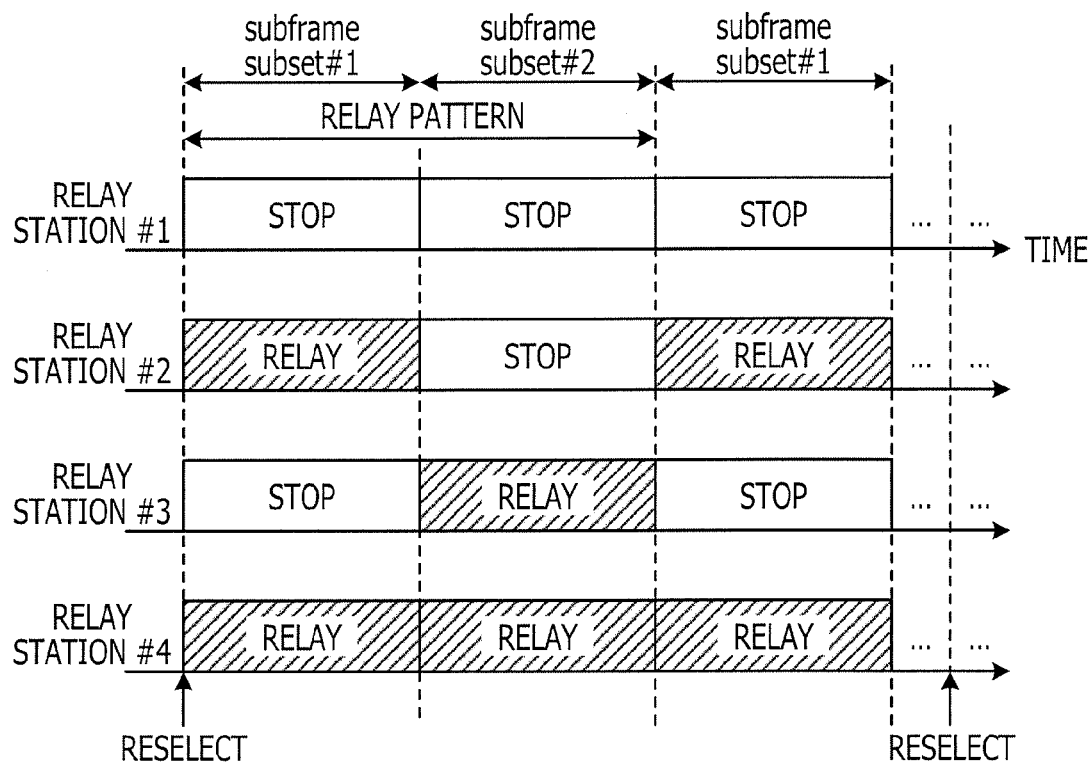
FIG. 8 is a diagram illustrating an example of relay pattern assignment when the unit period is equal to a subframe subset.

For example, in the 3rd Generation Partnership Project Long Term Evolution (3GPP LTE)-Advanced, specifications called channel state information (CSI) resource measurement restriction is defined in the specifications. According to the specifications, a terminal divides a radio zone of one frame (10 ms) into two zones called a "subframe subset #1" and a "subframe subset #2", and measures signal quality within each of the two zones being closed. Therefore, when the base station 10, the relay stations 30, and the terminals 50 are based on LTE specifications, the unit period may be equal to a subframe subset. FIG. 8 is a diagram illustrating an example of relay pattern assignment when the unit period is equal to a subframe subset. A base station notifies a terminal of information about the zone of each subframe subset, and therefore, information that has to be additionally measured does not exist.

Second Embodiment

In the first embodiment, a base station assigns relay patterns to relay stations, based on first path loss values and second path loss values within the communication area of that base station. In contrast, in a second embodiment, a first base station acquires information on the unit period length and the pattern length of relay patterns in a second base station adjacent to the first base station, from that second base station. Then, the first base station modifies relay patterns temporarily assigned (temporarily decided upon) in the first base station, based on the "unit period length" and the "pattern length" of relay patterns in the second base station.

Overview of Communication System

Figure 9:
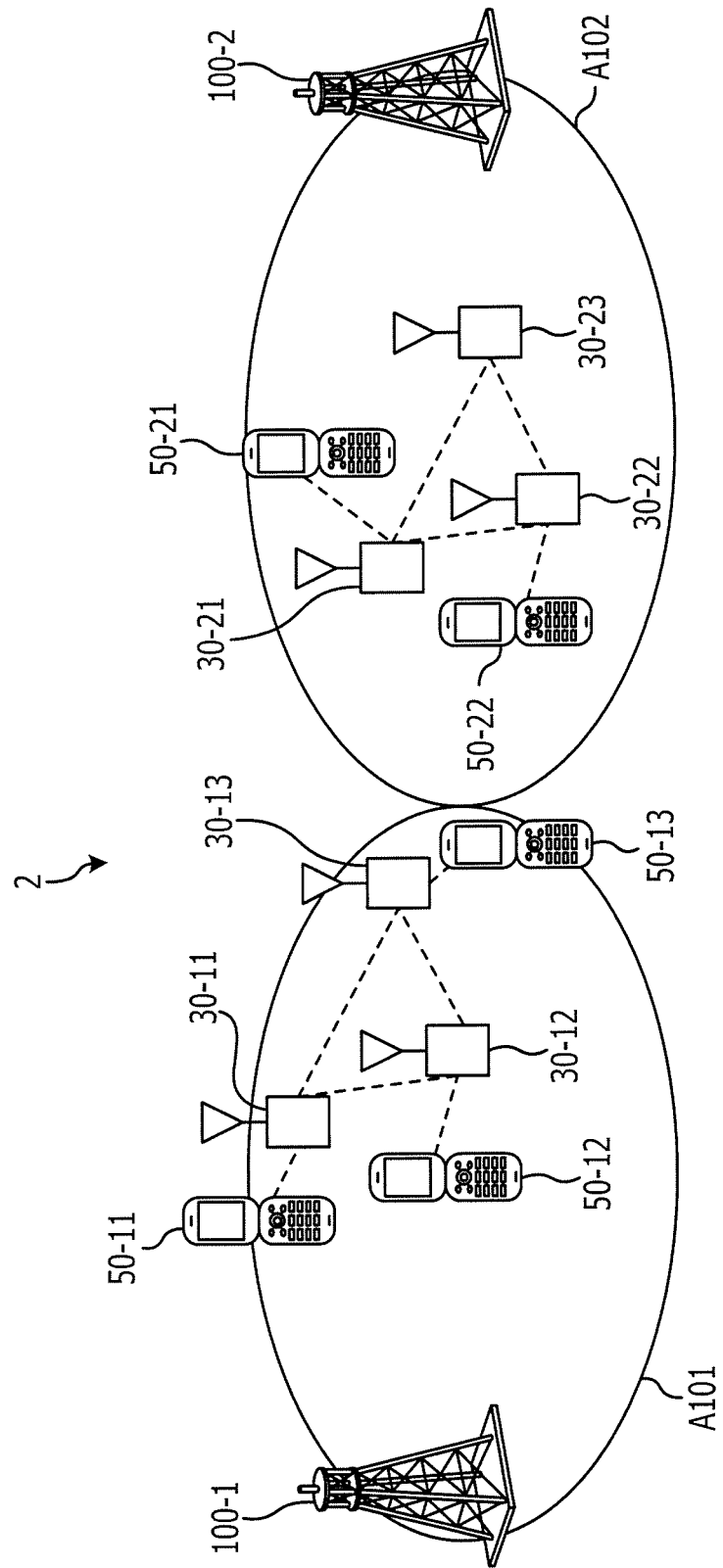
FIG. 9 is a pictorial representation illustrating an example of a communication system of a second embodiment.

FIG. 9 is a pictorial representation illustrating an example of a communication system of the second embodiment. In FIG. 2, the communication system 2 includes base stations 100-1 and 100-2, relay stations 30-11 to 30-13 and 30-21 to 30-23, and terminals 50-11 to 50-13, 50-21, and 50-22. Although two base stations 100, six relay stations 30, five terminals 50 are illustrated here, the numbers of the components are not limited to these numbers. Additionally, hereinafter, the base stations 100-1 and 100-2 are sometimes generically referred to as base stations 100 if they are not to be discriminated from one another. The relay stations 30-11 to 30-13 and 30-21 to 30-23 are sometimes generically referred to as relay stations 30 if they are not to be discriminated from one another. Similarly, the terminals 50-11 to 50-13, 50-21, and 50-22 are sometimes generically referred to as terminals 50 if they are not to be discriminated from one another.

In a way similar to the way of relay pattern assignment in the base station 10 of the first embodiment, the base station 100-1 temporarily assigns relay patterns to relay stations existing within a communication area A101. Like the base station 100-1, first, the base station 100-2 temporarily assigns relay patterns to the relay stations 30 existing within a communication area A102 in a way similar to the way of relay pattern assignment in the base station 10 of the first embodiment.

Then, the base station 100-1 acquires information on the "unit period length" and the "pattern length" of the relay patterns temporarily assigned in the base station 100-2, from the base station 100-2. Then, the base station 100-1 modifies the relay patterns temporarily assigned in the base station 100-1, based on the "unit period length" and the "pattern length" of the relay patterns in the base station 100-2. Like the base station 100-1, the base station 100-2 also acquires information on the "unit period length" and the "pattern length" of the relay patterns temporarily assigned in the base station 100-1, from the base station 100-1. Then, the base station 100-2 modifies the relay patterns temporarily assigned in the base station 100-2, based on the "unit period length" and the "pattern length" of the relay patterns in the base station 100-1.

Then, the base station 100-1 notifies the relay stations 30 existing within the communication area A101 of the modified relay patterns, respectively. The base station 100-2 also notifies the relay stations 30 existing within the communication area A102 of the modified relay patterns, respectively.

In such a way as described above, by adjusting relay patterns among a plurality of base stations 100 adjacent to one another, signal quality in one cell may be inhibited from varying due to influence from another cell.

Exemplary Configuration of Base Station

Figure 10:
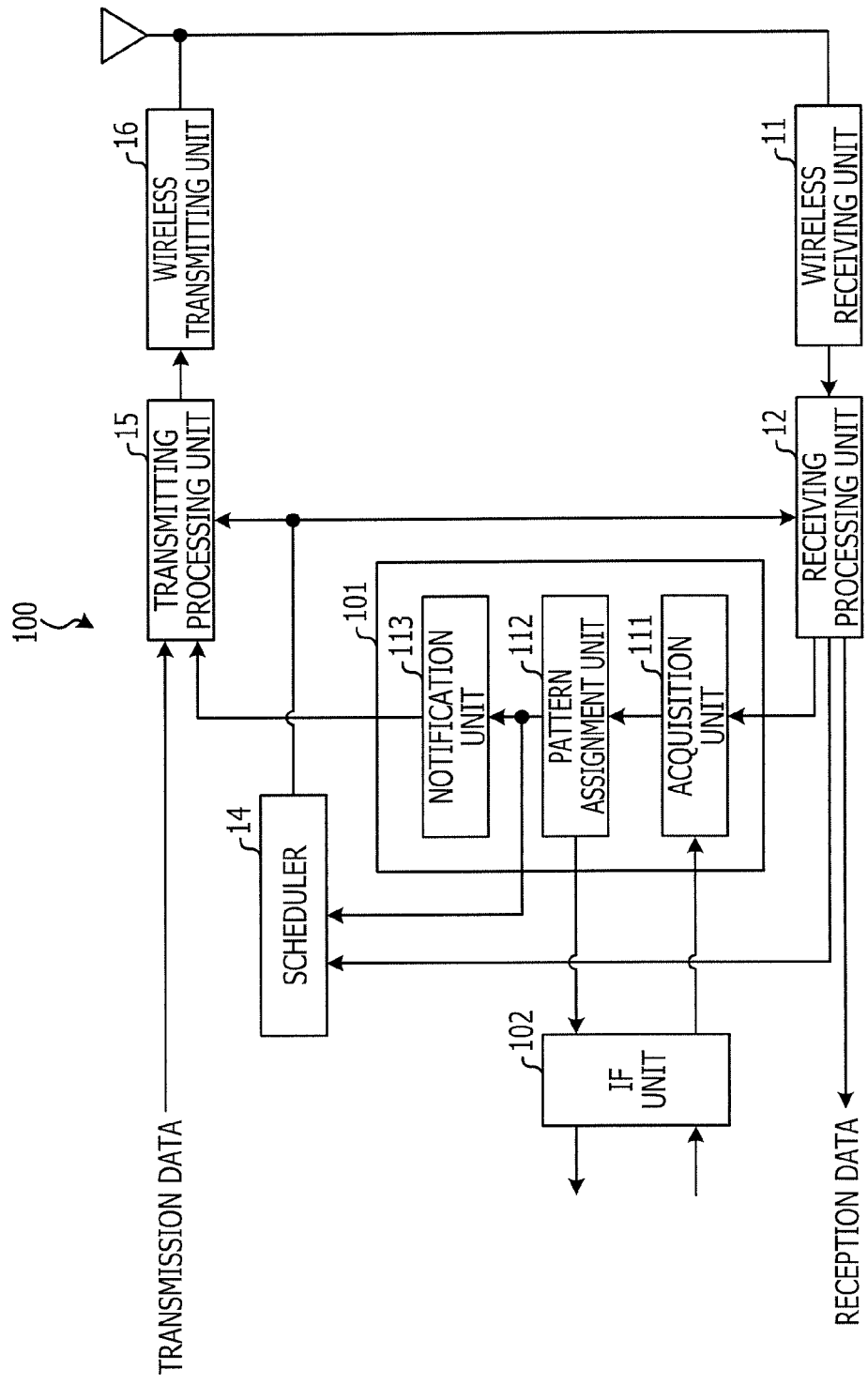
FIG. 10 is a block diagram illustrating an example of a base station of the second embodiment.

FIG. 10 is a block diagram illustrating an example of the base station of the second embodiment. In FIG. 10, the base station 100 includes a pattern-assignment control unit 101 and an interface (IF) unit 102. The pattern-assignment control unit 101 includes an acquisition unit 111, a pattern assignment unit 112, and a notification unit 113.

Like the acquisition unit 21 of the first embodiment, the acquisition unit 111 acquires information on the first path loss values and information on the second path loss values from the relay stations 30 and the terminals 50 existing within the communication area of the base station 100, and outputs them to the pattern assignment unit 112.

The acquisition unit 111 also acquires information on the "unit period length" and the "pattern length" of relay patterns temporarily assigned in another adjacent base station 100, from that base station 100, and outputs the information to the pattern assignment unit 112.

The pattern assignment unit 112 temporarily assigns relay patterns to the relay stations 30 existing within the communication area of the base station 100 in the same way as the pattern assignment unit 22 of the first embodiment. The pattern assignment unit 112 transmits (notifies) information on the unit period length and the pattern length of the temporarily assigned relay patterns through the IF unit 102 to the other adjacent base station 100. Then, the pattern assignment unit 112 modifies the temporarily assigned relay patterns, based on the "unit period length" and the "pattern length" of relay patterns in the other adjacent base station 100.

For example, regarding the unit period length, when the unit period lengths used in the base station 100 and the other base station 100 are different, the pattern assignment unit 112 selects the longer one. Regarding the pattern length, when the pattern lengths used in the base station 100 and the other base station 100 are different, the pattern assignment unit 112 adopts the least common multiple of the pattern length of the base station 100 and the pattern length of the other base station 100, as the pattern length of the modified relay pattern. Then, the pattern assignment unit 112 adjusts the unit period length of the temporarily assigned relay patterns to the selected unit period length mentioned above and also adjusts the pattern length to the least common multiple mentioned above, while maintaining the ratio of the number of unit periods indicating execution of relay to the number of unit periods indicating non-execution of relay in each of the temporarily assigned relay patterns.

The notification unit 113 notifies the relay stations 30 existing within the communication area of the base station 100 of information on the modified relay patterns.

Exemplary Operations of Communication System

Figure 11:
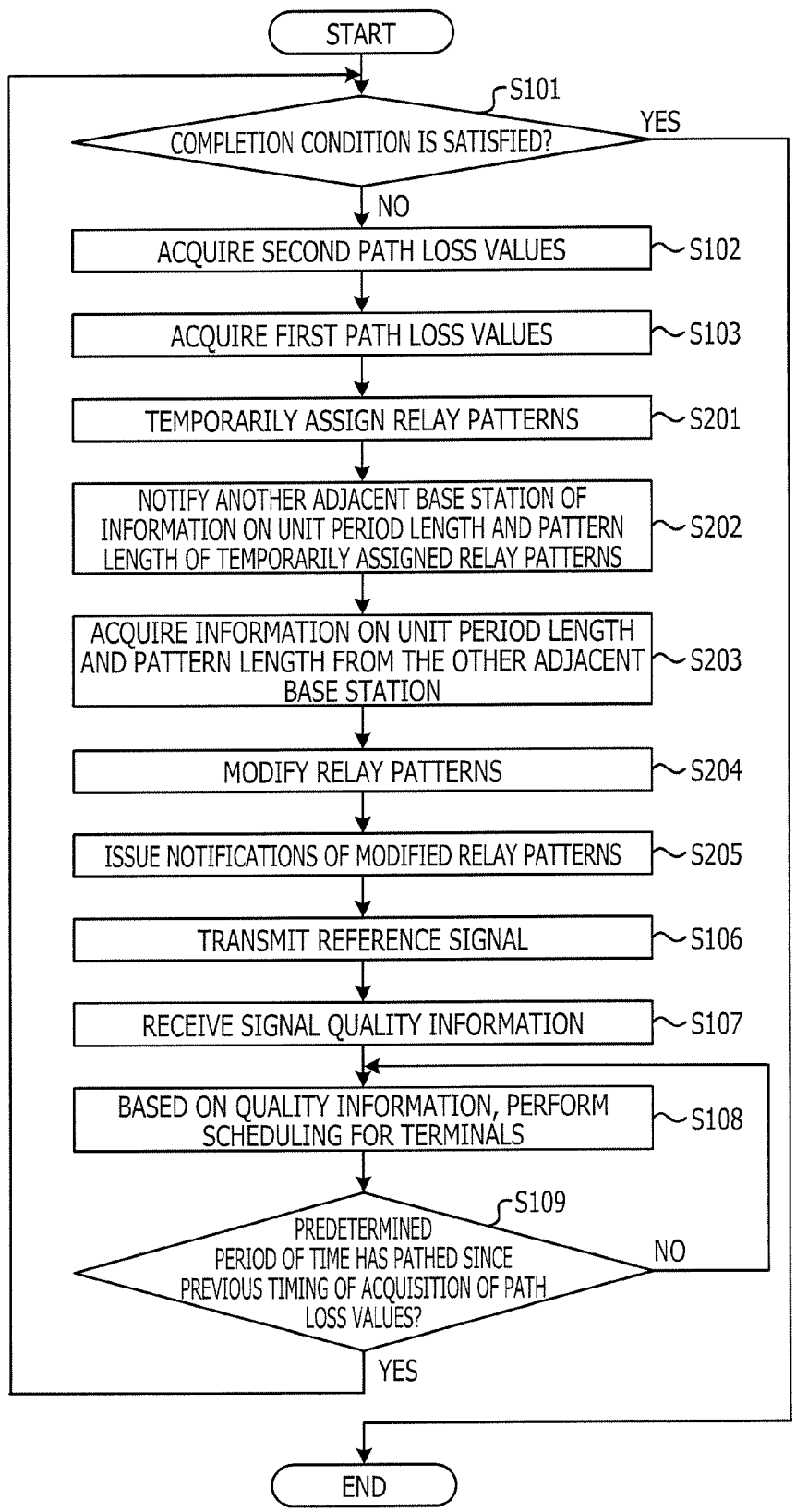
FIG. 11 is a flowchart illustrating an example of processing operations of the base station of the second embodiment.

Processing operations of the communication system 2 having the configuration described above will be described. In particular, the processing operations of the base station 100 will mainly be described. FIG. 11 is a flowchart illustrating an example of the processing operations of the base station of the second embodiment. The flow of FIG. 11, for example, starts at a timing when the base station 100 is powered on, and ends when the completion condition is satisfied (affirmative at step S101).

The pattern assignment unit 112 temporarily assigns relay patterns to the relay stations 30 (step S201). Processing at step S201 is equivalent to the processing at step S104 of the first embodiment. That is, relay patterns are temporarily decided upon only within the cell concerned without any awareness of the states of other cells.

For example, in the communication area A101 of FIG. 9, for all the relay stations 30-11 to 30-13, the terminals 50 each having a second path loss value smaller than the second threshold exist. Additionally, all the relay stations 30-11 to 30-13 each have a first path loss value smaller than the first threshold. Therefore, relay patterns having non-overlapping unit periods indicating execution of relay are preferably assigned to the relay stations 30-11 to 30-13. Accordingly, the pattern assignment unit 112 of the base station 100-1 determines that the pattern length is three. The pattern assignment unit 112 of the base station 100-1 also assumes that the unit period length is 1 ms.

In contrast, in the communication area A102, the terminal 50 having a second path loss value smaller than the second threshold exists for each of the relay stations 30-21 and 30-22, but does not exists for the relay station 30-23. Additionally, all the relay stations 30-21 to 30-23 each have a first path loss value smaller than the first threshold. Therefore, relay patterns having non-overlapping unit periods indicating execution of relay are preferably assigned to the relay stations 30-21 and 30-22. In contrast, relay patterns in which all the unit periods indicate non-execution of relay are preferably assigned to the relay station 30-23. Accordingly, the pattern assignment unit 112 of the base station 100-2 determines that the pattern length is two. The pattern assignment unit 112 of the base station 100-2 also assumes that the unit period length is 2 ms.

The pattern assignment unit 112 notifies another adjacent base station 100, through the IF unit 102, of information on the unit period length and the pattern length of the temporarily assigned relay patterns (step S202). This information may be notified through a core network, or may be notified through a communication line (in the LTE, called an X2 line").

The acquisition unit 111 acquires information on the "unit period length" and the "pattern length" of the relay patterns temporarily assigned in the other adjacent base station 100, from this base station 100 (step S203).

The pattern assignment unit 112 modifies the temporarily assigned relay patterns, based on the "unit period length" and the "pattern length" of relay patterns in the other adjacent base station 100 (step S204).

In particular, regarding the unit period length, when the unit period lengths used in the base station 100 and the other base station 100 are different, the pattern assignment unit 112 selects the longer one. Regarding the pattern length, when the pattern lengths used in the base station 100 and the other base station 100 are different, the pattern assignment unit 112 adopts the least common multiple of the pattern length of the base station 100 and the pattern length of the other base station 100, as the pattern length of the modified relay pattern. Then, the pattern assignment unit 112 adjusts the unit period length of the temporarily assigned relay patterns to the selected unit period length mentioned above and also adjusts the pattern length to the least common multiple mentioned above, while maintaining the ratio of the number of unit periods indicating execution of relay to the number of unit periods indicating non-execution of relay in each of the temporarily assigned relay patterns.

Figure 12:
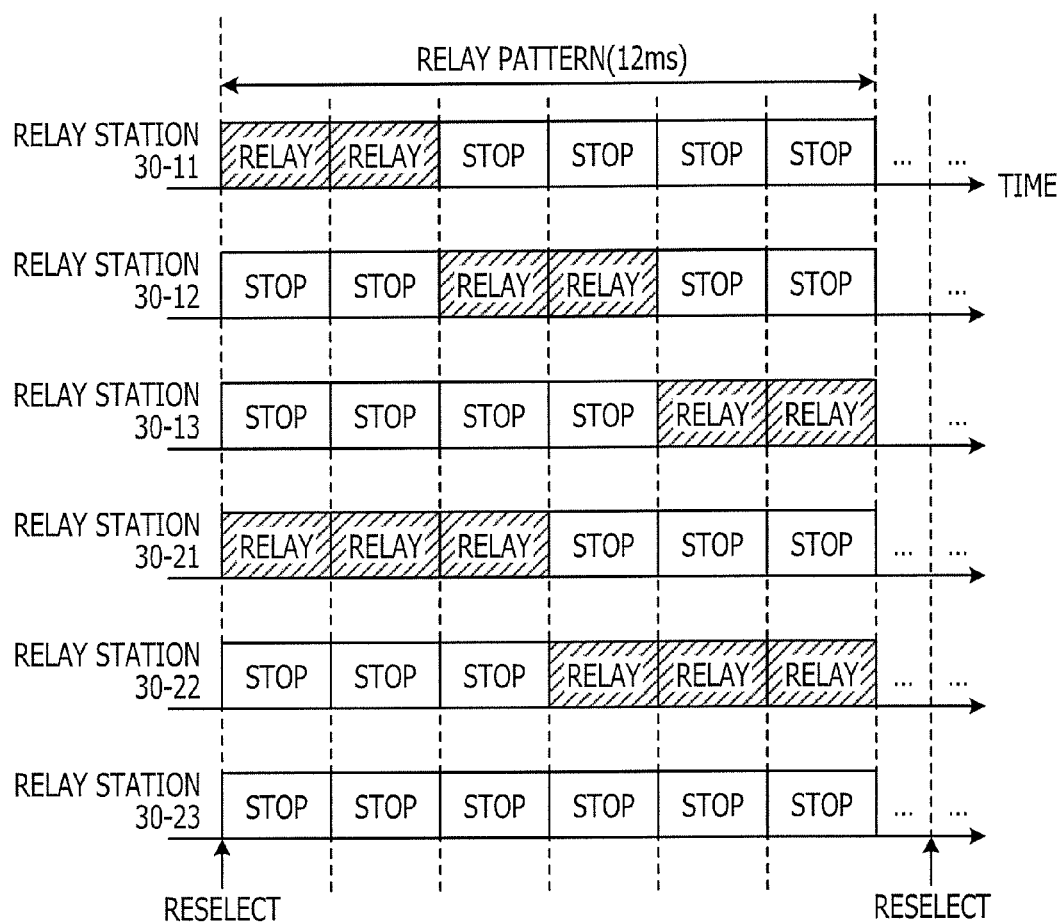
FIG. 12 is a diagram illustrating modified relay patterns.

For example, in the case of the above example illustrated in FIG. 9, the pattern assignment unit 112 of the base station 100-1 selects 2 ms as the modified unit period length. Since the pattern length of the communication area A101 is three and the pattern length of the communication area A102 is two, the least common multiple mentioned above is six. The relay patterns modified in this way are illustrated in FIG. 12. FIG. 12 is a diagram illustrating modified relay patterns.

The notification unit 113 notifies each relay station 30 existing within the communication area of the base station 100 of information on modified relay patterns (step S205).

As described above, according to this embodiment, the acquisition unit 111 in the base station 100 (corresponding to the above base station 100-1) acquires information on relay patterns temporarily assigned to the relay stations 30 existing within a communication area (cell) for another base station 100 (corresponding to the above base station 100-2), from the other base station 100 (corresponding to the above base station 100-2). The pattern assignment unit 112 modifies the relay patterns temporarily assigned in the base station 100 (corresponding to the above base station 100-1), based on information on relay patterns temporarily assigned in the other base station 100 (corresponding to the above base station 100-2).

With such a configuration of the base station 100, by adjusting relay patterns among a plurality of base stations 100 adjacent to one another, signal quality in one cell may be inhibited from varying due to influence from another cell.

Other Embodiments

[1] Although, in the first and second embodiments, the cases where the pattern assignment units 13 and 101 are incorporated into the base stations 10 and 100 have been described, the present discloser is not limited to this. The pattern-assignment control units 13 and 101 may be devices (pattern-assignment control unit s) separate from the base stations 10 and 100.

[2] Components of units illustrated in the drawings in the first and second embodiments do not have to be physically configured as illustrated. That is, specific forms of distribution and integration of components are not limited to those illustrated in the drawings, and may be configured, in part or in whole, to be functionally or physically distributed and integrated on an arbitrary unit in accordance with various load, usage conditions, and so forth.

Furthermore, various processing functions performed with devices may be executed, in any part or in whole, on a central processing unit (CPU) (or a microcomputer such as a micro processing unit (MPU) or a micro controller unit (MCU)). Additionally, various processing functions may be performed, in any part or in whole, on programs analyzed and executed by a CPU (or a microcomputer such as a MPU or a MCU), or on hardware using wired logic.

The base stations and the relay stations of the first and second embodiments may be realized by the following hardware configurations.

Figure 13:
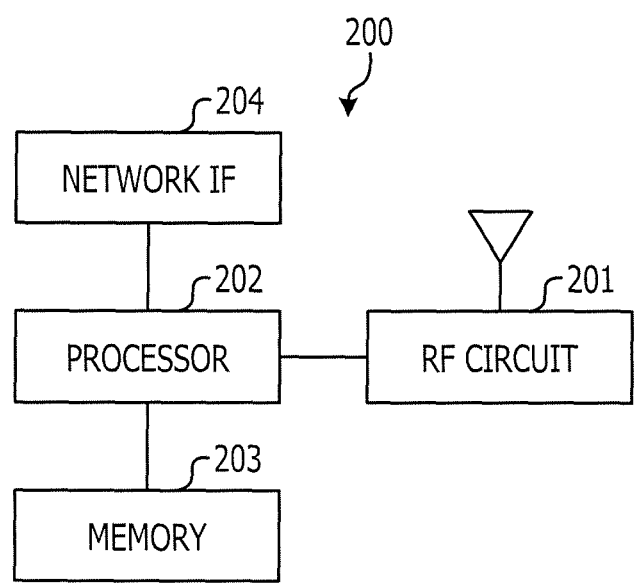
FIG. 13 is a block diagram illustrating an example of a hardware configuration of a base station.

FIG. 13 is a block diagram illustrating an example of a hardware configuration of a base station. As illustrated in FIG. 13, the base station 200 includes a radio frequency (RF) circuit 201, a processor 202, a memory 203, and a network interface (IF) 204. Examples of the processor 202 include a CPU, a digital signal processor (DSP), a field programmable gate array (FPGA). Examples of the memory 203 include random access memories such as a synchronous dynamic random access memory (SDRAM), a read only memory (ROM), and a flash memory. Each of the base stations 10 and 100 illustrated in the first and second embodiments has a hardware configuration as illustrated in FIG. 13.

Various processing functions performed in the base stations of the first and second embodiments may be implemented by executing programs stored in various memories such as nonvolatile storage media by a processor included in an amplifying device.

That is, programs corresponding to processing performed by the receiving processing unit 12, the pattern-assignment control unit s 13 and 101, the scheduler 14, and the transmitting processing unit 15 may be recorded in the memory 203, and each of the programs may be executed by the processor 202. Note that the wireless receiving unit 11 and the wireless transmitting unit 16 are implemented by the RF circuit 201. The interface unit 102 is implemented by the network IF 204.

Figure 14:
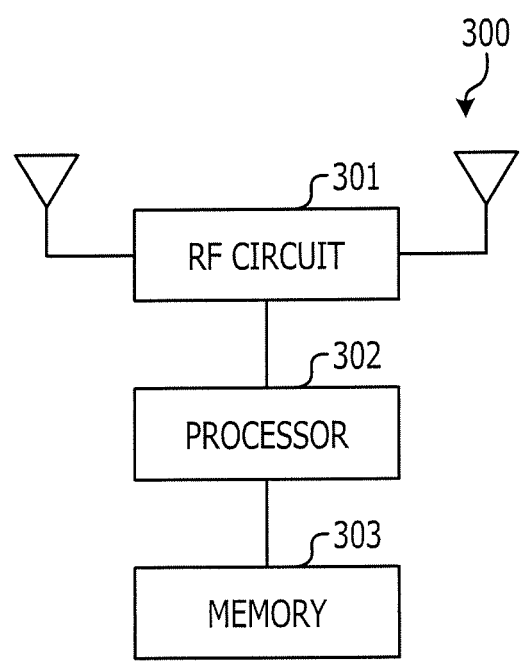
FIG. 14 is a block diagram illustrating an example of a hardware configuration of a relay station.

FIG. 14 is a block diagram illustrating an example of a hardware configuration of a relay station. As illustrated in FIG. 14, the relay station 300 includes an RF circuit 301, a processor 302, and a memory 303. Examples of the processor 302 include a CPU, a DSP, and an FPGA. Examples of the memory 303 include RAMs such as an SDRAM, a ROM, and a flash memory.

Various processing functions performed in the relay stations of the first and second embodiments may be implemented by executing programs stored in various memories such as nonvolatile storage media by a processor included in an amplifying device.

That is, programs for processing performed by the acquisition unit 32 and the switching control unit 33 may be recorded in the memory 303, and each program may be executed by the processor 302. Additionally, the wireless receiving units 31 and 36, the relay amplifying units 34 and 37, and the wireless transmitting units 35 and 38 are implemented by the RF circuit 301.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although various embodiments of the present invention have been described in detail, it should be understood that the various changes, substitutions, and alterations could be made hereto without departing from the spirit and scope of the invention.

What is claimed is:

1. A control apparatus in a wireless communication system including a base station, a plurality of relay stations, and a plurality of terminals, each of the plurality of relay stations being configured to relay wireless signals between the base station and the plurality of terminals, the control apparatus comprising:
a memory; and
a processor coupled to the memory and configured to
determine relay schedules based on first information associated with first path losses between any pair of the plurality of relay stations, each of the relay schedules defining each of relay periods for each of the plurality of relay stations relaying the wireless signals, and
transmit each of the relay schedules to each of the plurality of relay stations respectively.

2. The control apparatus according to claim 1, wherein the processor is further configured to
identify relay stations from the plurality of relay stations, for which the first path losses respective to the identified relay stations are less than a first value, and
determine the relay schedules for the identified relay stations so that the relay periods respective to the identified relay stations do not overlap each other.

3. The control apparatus according to claim 2, wherein the processor is further configured to determine the relay schedules based on second information associated with second path losses between any pair of one of the plurality of relay stations and one of the plurality of terminals.

4. The control apparatus according to claim 3, wherein the identified relay stations include a first relay station and a second relay station, and
the processor is further configured to determine a first relay schedule for the first relay station and a second relay schedule for the second relay station so that a first relay period of the first relay schedule is shorter than a second relay period of the second relay schedule when a first number is less than a second number, the first number is a number of terminals for which second path losses with the first relay station are less than a second value, the second number is a number of terminals for which second path losses with the second relay station are less than the second value.

5. The control apparatus according to claim 4, wherein the processor is further configured to determine the relay schedules so that the relay periods, for the plurality of relay station for which second path losses are greater than the second value, are set to none of the sequential periods having the given length.

6. The control apparatus according to claim 2, wherein each of the relay periods are defined among sequential periods, and each of the sequential periods has a given length.

7. The control apparatus according to claim 6, wherein the processor is further configured to determine the relay schedules so that the relay periods, for the plurality of relay station for which first path losses are greater than first value, are set to all of the sequential periods having the given length.

8. The control apparatus according to claim 1, wherein the processor is further configured to determine the relay schedules based on second information associated with second path losses between any pair of one of the plurality of relay stations and one of the plurality of terminals.

9. The control apparatus according to claim 1, wherein each of the relay periods are defined among sequential periods, and each of the sequential periods has a given length.

10. The control apparatus according to claim 1, wherein the processor is further configured to
receive other relay schedules for another plurality of relay stations relaying other wireless signals between another base station and another plurality of terminals,
update the relay schedules based on the received other relay schedules, and
transmit each of the updated relay schedules to each of the plurality of relay stations respectively.

11. The control apparatus according to claim 1, wherein each period of the sequential periods is substantially equal to a period during which the plurality of terminals is configured to measure the wireless signals.

12. The control apparatus according to claim 1, wherein the first information is generated based on measurement of the wireless signals at the plurality of relay stations.

13. The control apparatus according to claim 1, wherein the control apparatus includes the base station.

14. The control apparatus according to claim 1, wherein the plurality of relay stations are full duplex type.

15. The control apparatus according to claim 1, wherein the plurality of relay stations have no scheduler for the plurality of terminals.

16. A control method for a wireless communication system including a base station, a plurality of relay stations, and a plurality of terminals, each of the plurality of relay stations being configured to relay wireless signals between the base station and the plurality of terminals, the control method comprising:
  determining relay schedules based on first information associated with first path losses between any pair of the plurality of relay stations, each of the relay schedules defining each of relay periods for each of the plurality of relay stations relaying the wireless signals; and
  transmitting each of the relay schedules to each of the plurality of relay stations respectively.

17. A wireless communication system comprising:
a base station;
a plurality of terminals;
a plurality of relay stations, each of the plurality of relay stations being configured to relay wireless signals between the base station and the plurality of terminals; and
a control apparatus configured to
determine relay schedules based on first information associated with first path losses between any pair of the plurality of relay stations, each of the relay schedules defining each of relay periods for each of the plurality of relay stations relaying the wireless signals, and
transmit each of the relay schedules to each of the plurality of relay stations respectively.

* * * * *